(12) United States Patent
Tang (10) Patent No.: US 11,895,642 B2
(45) Date of Patent: Feb. 6, 2024

(54) WIRELESS COMMUNICATION METHOD FOR SIDELINK RESOURCE SCHEDULING, USER EQUIPMENT, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 107 days.

(21) Appl. No.: 17/018,219

(22) Filed: Sep. 11, 2020

(65) Prior Publication Data

US 2020/0413429 A1  Dec. 31, 2020

Related U.S. Application Data

(63) Continuation of application No. PCT/CN2018/112775, filed on Oct. 30, 2018.

(30) Foreign Application Priority Data

Mar. 23, 2018 (WO) ............... PCT/CN2018/080258

(51) Int. Cl.
*H04W 72/1268* (2023.01)
*H04W 28/02* (2009.01)
(Continued)

(52) U.S. Cl.
CPC ... *H04W 72/1268* (2013.01); *H04W 28/0268* (2013.01); *H04W 72/0446* (2013.01); *H04W 92/18* (2013.01)

(58) Field of Classification Search
CPC ......... H04W 72/1268; H04W 28/0268; H04W 72/0446; H04W 92/18
See application file for complete search history.

(56) References Cited

U.S. PATENT DOCUMENTS

| 7,123,172 B1 | 10/2006 | Ordentlich |
| 9,301,316 B2 | 3/2016 | Moulsley et al. |

(Continued)

FOREIGN PATENT DOCUMENTS

| CN | 103782640 A | 5/2014 |
| CN | 106404748 A | 2/2017 |

(Continued)

OTHER PUBLICATIONS

Huawei, CATT, LG Electronics, HiSilicon, China Unicom, New WID on 3GPP V2X Phase 2, Approval, 3GPP TSG RAN Meeting #75 RP-170798, Mar. 6-9, 2017.

(Continued)

*Primary Examiner* — Michael Thier
*Assistant Examiner* — Nevena Zecevic Sandhu
(74) *Attorney, Agent, or Firm* — PERKINS COIE LLP (57) ABSTRACT

Disclosed are a radio communication method and equipment. The radio communication method comprises: a user equipment determines, on the basis of mapping relations, an uplink scheduling request format corresponding to sidelink data that needs to be transmitted, the mapping relations comprising mapping relations between different sidelink data and different uplink scheduling request formats; and the user equipment transmits an uplink scheduling request to a network device on the basis of the uplink scheduling request format.

20 Claims, 4 Drawing Sheets

(51) Int. Cl.
*H04W 72/0446* (2023.01)
*H04W 92/18* (2009.01)

(56) References Cited

U.S. PATENT DOCUMENTS

| | | | |
|---|---|---|---|
| 2012/0081516 | A1 | 4/2012 | Tsukagoshi |
| 2014/0133447 | A1 | 5/2014 | Moulsley et al. |
| 2017/0118671 | A1* | 4/2017 | Lee ................. H04W 72/14 |
| 2017/0303319 | A1 | 10/2017 | Han |
| 2017/0374642 | A1 | 12/2017 | Lee et al. |
| 2018/0049227 | A1 | 2/2018 | Moon et al. |
| 2019/0098642 | A1* | 3/2019 | Baer ................. H04W 48/14 |
| 2019/0132856 | A1 | 5/2019 | Moon et al. |
| 2020/0092903 | A1 | 3/2020 | Moon et al. |
| 2020/0187168 | A1* | 6/2020 | Liu ................. H04L 5/0048 |
| 2020/0374744 | A1* | 11/2020 | Liu ................. H04W 76/11 |

FOREIGN PATENT DOCUMENTS

| | | |
|---|---|---|
| CN | 106550457 A | 3/2017 |
| CN | 107295679 A | 10/2017 |
| CN | 107347215 A | 11/2017 |
| CN | 107592984 A | 1/2018 |
| RU | 2593385 C1 | 8/2016 |
| WO | 2016177162 A1 | 11/2016 |
| WO | 2017135580 A1 | 8/2017 |
| WO | WO-2017171251 A1 * | 10/2017 |
| WO | 2017197264 A1 | 11/2017 |
| WO | 2018030832 A1 | 2/2018 |

OTHER PUBLICATIONS

Written Opinion of the International Search Authority in the international application No. PCT/CN2018/112775, dated Dec. 27, 2018.
Written Opinion of the International Search Authority in the international application No. PCT/CN2018/080258, dated Dec. 13, 2018.
First Office Action of the Chinese application No. 202011077599.0, dated Sep. 29, 2021. 21 pages with English translation.
Office Action of the Indian application No. 202017044863, dated Dec. 3, 2021. 5 pages with English translation.
International Search Report in the international application No. PCT/CN2018/112775, dated Dec. 27, 2018.
OPPO."Resource Selection for sTTI in eV2x" 3GPP TSG-RAN2 Meeting #101 R2-1801849, Feb. 15, 2018 (Feb. 15, 2018), section 2.
International Search Report in the international application No. PCT/CN2018/080258, dated Dec. 13, 2018.
Supplementary European Search Report in the European application No. 18910838.4, dated Mar. 29, 2021.
Huawei et al: "Discussion on the questions in SA2 Ls on reliability for eV2X", 3GPP Draft; R2-1801907, 3rd Generation Partnership Porject (3GPP), Mobile Competence Centre; 650, Route Des Lucioles; F-06921 Sophia-Ant, vol. RAN WG2, No. Athens, Greece; Feb. 26, 2018-Mar. 2, 2018, Feb. 15, 2018 (Feb. 15, 2018).
Ericsson et al: "Sidelink SPS Configuration", 3GPP Draft; R2-168702, 3rd Generation Partnership Porject (3GPP), Mobile Competence Centre; 650, Route Des Lucioles; F-06921 Sophia-Antipolis Cedex; France, vol. RAN WG2, No. Reno, Nevada, USA; Nov. 14, 2016-Nov. 18, 2016, Nov. 13, 2016 (Nov. 13, 2016).
CATT: "Discussion on SR", 3GPP Draft; R2-1707915, 3rd Generation Partnership Porject (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017, Aug. 20, 2017 (Aug. 20, 2017).
First Office Action of the Russian application No. 2020133425, dated Feb. 11, 2022. 11 pages with English translation.
Written Opinion of the Singaporean application No. 11202009312P, dated Jun. 29, 2022 (9 pages).
Notice of Intention to Refuse Patent Application of the Singaporean application No. 11202009312P, dated Apr. 25, 2023. 3 pages.
First Office Action of the Vietnamese application No. 1-2020-05995, dated Apr. 28, 2023. 3 pages with English translation.

* cited by examiner

# WIRELESS COMMUNICATION METHOD FOR SIDELINK RESOURCE SCHEDULING, USER EQUIPMENT, AND NETWORK DEVICE

CROSS REFERENCE TO RELATED APPLICATIONS

This application is a continuation application of International application No. PCT/CN2018/112775, filed on Oct. 30, 2018 and entitled "RADIO COMMUNICATION METHOD, USER EQUIPMENT, AND NETWORK DEVICE", which claims priority to International application No. PCT/CN2018/080258, filed on Mar. 23, 2018 and entitled "Wireless communication method, user equipment and network device", the disclosure of which are hereby incorporated by reference in their entireties.

TECHNICAL FIELD

The disclosure relates to the field of wireless communication, and particularly to a method for wireless communication, a user equipment (UE) and a network device.

BACKGROUND

In a long-term evolution (LTE) system, when a user equipment (UE) has data to send, the UE needs to send an uplink scheduling request (SR) to a network device so as to request for an uplink resource A vehicle-to-everything (V2X) system requires a low data transmission delay, while the requirement of a low data transmission delay of the V2X system cannot be met by an existing uplink resource request procedure. Therefore, how to design an uplink resource scheduling scheme to reduce the data transmission delay is an urgent problem to be solved.

DETAILED DESCRIPTION

Many technical details are provided in the description below, for better understanding of the disclosure. However, those of ordinary skill in the art may understand that the technical solutions set forth in the disclosure can still be realized without the technical details and various changes and modifications made based on the embodiments hereinafter.

Description of some terms are given below.

UE: user equipment

In the embodiments of the disclosure, a UE may be, for example, a smart phone, a tablet, a desktop, a personal computer, a customized wireless terminal, an Internet of Things (IoT) node, a wireless communication module, or any other devices capable of wireless communication with a network device or with one another according to an agreed communication protocol.

LTE: long-term evolution

D2D: device-to-device

V2X: vehicle-to-everything

SL: sidelink

UL: uplink

SR: uplink scheduling request or scheduling request

BSR: buffer status report

TTI: transmission time interval

PUCCH: physical uplink control channel

PPPP: ProSePer-Packet Priority

PPPR: ProSePer-Packet Reliablity

Some application scenes of embodiments of the disclosure are described briefly hereinafter.

A method for wireless communication, a user equipment and a network device are provided in embodiments of the disclosure, so that a requirement of a low delay in device-to-device (D2D) data transmission can be met.

In a first aspect according to embodiments of the disclosure, disclosed is a method for wireless communication, including: determining, by a user equipment (UE), according to a mapping relationship, an uplink scheduling request format corresponding to sidelink data needing to be sent, wherein the mapping relationship includes a mapping relationship from different sidelink data to different uplink scheduling request formats; and sending, by the UE, according to the uplink scheduling request format, an uplink scheduling request to a network device.

In a second aspect according to embodiments of the disclosure, further disclosed is a method for wireless communication, including: receiving, by a network device, an uplink scheduling request from a user equipment (UE), wherein an uplink scheduling request format of the uplink scheduling request is determined by the UE according to sidelink data needing to be sent and a mapping relationship, and the mapping relationship includes a mapping relationship from different sidelink data to different uplink scheduling request formats.

In a third aspect according to embodiments of the disclosure, further disclosed is user equipment (UE), including: a determination unit, configured to determine, according to a mapping relationship, an uplink scheduling request format corresponding to sidelink data needing to be sent, wherein the mapping relationship includes a mapping relationship from different sidelink data to different uplink scheduling request formats; and an uplink scheduling request sending unit, configured to send, according to the uplink scheduling request format, an uplink scheduling request to a network device.

In a fourth aspect according to embodiments of the disclosure, further disclosed is network device, including: an uplink scheduling request receiving unit, configured to receive an uplink scheduling request from a user equipment (UE), wherein an uplink scheduling request format of the uplink scheduling request is determined by the UE according to sidelink data needing to be sent and a mapping relationship, and the mapping relationship includes a mapping relationship from different sidelink data to different uplink scheduling request formats.

In a fifth aspect according to embodiments of the disclosure, further disclosed is user equipment (UE), including: a memory with computer-executable instructions stored therein; and a processor, configured to execute the computer-executable instructions so as to perform actions of the above method for wireless communication.

In a sixth aspect according to embodiments of the disclosure, further disclosed is network device, including: a memory with computer-executable instructions stored therein; and a processor, configured to execute the computer-executable instructions so as to perform actions of the above method for wireless communication.

In a seventh aspect according to embodiments of the disclosure, further disclosed is a computer-readable storage medium with computer-executable instructions stored therein, wherein the computer-executable instructions, when executed by a processor, cause the processor to perform actions of the above method for wireless communication.

Therefore, in the embodiments of the disclosure, by sending uplink scheduling requests with different uplink scheduling request formats to a network device, the network device is enabled to provide, in a timely manner, a resource grant to a UE for data transmission, so that a requirement of a low delay in D2D transmission of data is satisfied.

A large amount of technical features are disclosed in the specification of the embodiments of the disclosure, and are distributed in various technical solutions. If all possible combinations (i.e., technical solutions) of the technical features of the application were listed, the description would be too redundant. To avoid this problem, various technical features disclosed in the summary, in the embodiments and examples hereinafter, and in the accompanying drawings of the disclosure may be combined with one another freely, so as to constitute new technical solutions (these technical solutions should all be considered as disclosed in the description), unless these technical solutions are not practicable technically. For example, features A+B+C are disclosed in an example, and features A+B+D+E are disclosed in another example, features C and D are equivalent technical means that function identically, are alternative to each other technically and cannot be used together, and the feature E can be combined with the feature C. In this case, the solution of A+B+C+D should not be considered as having been disclosed due to non-practicability, and the solution of A+B+C+E should be considered as having been disclosed.

In a vehicle-to-everything (V2X) system, a long-term evolution device-to-device (LTE-D2D) communication based sidelink transmission technology is used. Different from the means of receiving or sending communication data through a base station in a typical LTE system, a means of D2D direct communication is used in the V2X system, thus having a higher spectral efficiency and a lower transmission delay.

In $3^{rd}$ generation partnership project release 14 (3GPP Rel-14), the V2X technology is standardized, and two transmission modes are defined: Mode 3 and Mode 4.

Figure 1:
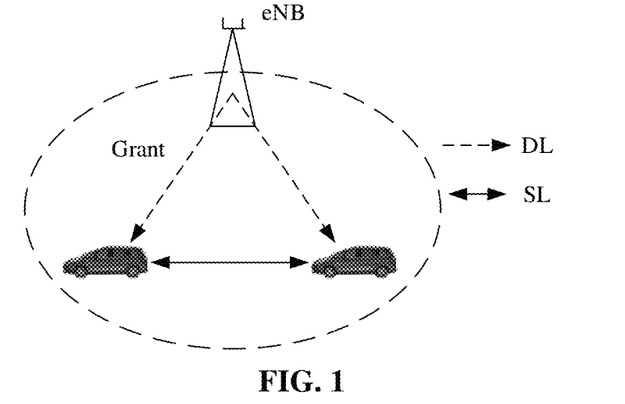
FIG. 1 illustrates a schematic diagram of Mode 3 in an LTE system.

Mode 3: as illustrated in FIG. 1, a transmission resource for a vehicle-mounted terminal is allocated by an evolved NodeB (eNB), and the vehicle-mounted terminal transmits data over a sidelink based on the resource allocated by the eNB. The eNB may allocate a resource to the terminal for a single transmission, or may allocate a resource to the terminal for semi-persistent transmission.

Figure 2:
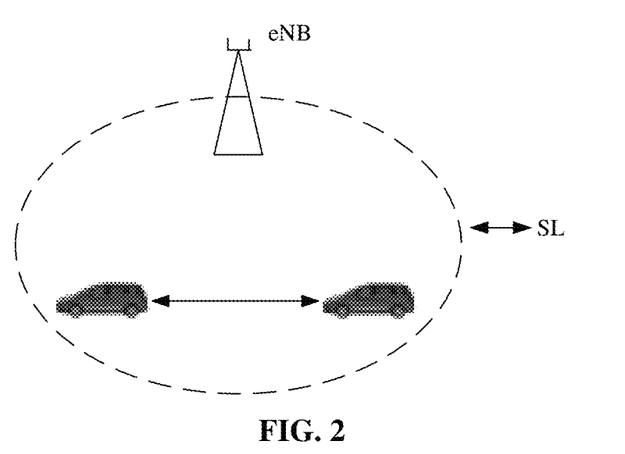
FIG. 2 illustrates a schematic diagram of Mode 4 in an LTE system.

Mode 4: as illustrated in FIG. 2, a sensing and reservation combined transmission mode is used in a vehicle-mounted terminal. The vehicle-mounted terminal acquires, from a resource pool, set of available transmission resources by sensing, and the terminal randomly selects, from the set of available transmission resources, a resource for data transmission. Since services in a V2X system have periodicity, semi-persistent transmission is usually employed by the terminal. That is, after selecting a transmission resource, the terminal will continuously use the resource in multiple transmission cycles, thereby reducing the probability of resource reselection and resource conflicts. The terminal will carry, in control information transmitted currently, information of a resource to be reserved for a next transmission, so that other terminals may determine, by detecting the control information of the terminal, whether the resource has been reserved and is to be used by a user, so as to achieve the purpose of reducing resource conflicts In Rel-15, a lower delay is required in an evolved V2X (eV2X) system. For example, a D2D delay of 3 ms to 5 ms needs to be supported, which requires that a network can provide, in a timely manner, a resource grant for a UE to transmit data in Mode 3.

Figure 3:
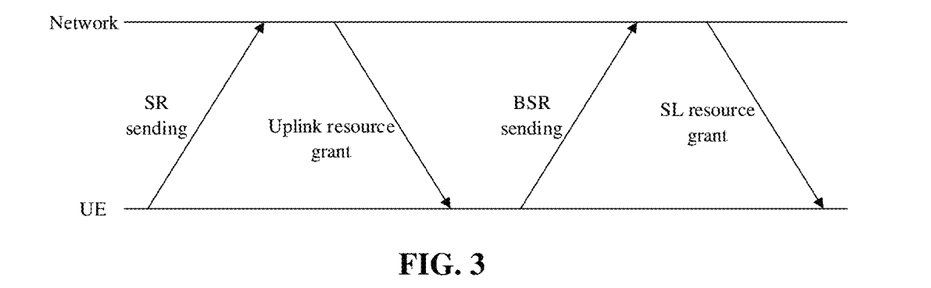
FIG. 3 illustrates a schematic diagram of a resource requesting procedure in an LTE system.

As illustrated in FIG. 3, the procedure of a user applying to a network for a sidelink (SL) resource is: scheduling request (SR) sending—uplink resource grant—SL buffer status report (BSR) sending—SL resource grant. According to present configurations, there is a delay of 16 ms (assuming that a transmission time interval (TTI) has a length of 4 ms) in the procedure, which is higher than the delay of 3 ms to 5 ms required. Therefore, the method for applying for an uplink resource for an SL needs to be improved, to have a lower delay.

It is to be noted that the technical solution of the disclosure may be, but not limited to, applied to a V2X system.

To make the objectives, technical solutions and advantages of the disclosure clearer, embodiments of the disclosure will be further described in detail in conjunction with accompanying drawings.

Figure 4:
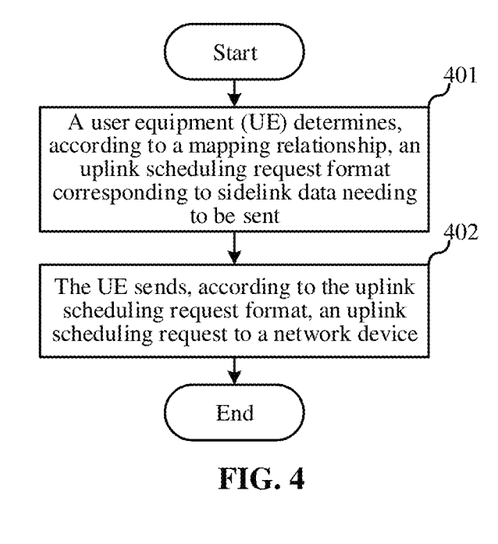
FIG. 4 illustrates a schematic flowchart of a method for wireless communication according to a first embodiment of the disclosure.

A first embodiment of the disclosure relates to a method for wireless communication. FIG. 4 illustrates a schematic flowchart of the method for wireless communication. In particular, as illustrated in FIG. 4, the method for wireless communication includes actions 401 and 402.

In action 401, a user equipment (UE) determines, according to a mapping relationship, an uplink scheduling request format corresponding to sidelink data needing to be sent. The mapping relationship includes a mapping relationship from different sidelink data to different uplink scheduling request formats. After that, action 402 is performed: the UE sends, according to the uplink scheduling request format, an uplink scheduling request to a network device. Then, the procedure ends.

Alternatively, before action 401, the method for wireless communication may further include that the UE receives the mapping relationship from the network device.

Alternatively, before the UE receives the mapping relationship from the network device, the method for wireless communication may further include: the UE sends user capability information of the UE to the network device.

Alternatively, the user capability information includes at least one of: whether the UE supports use of a short transmission time interval (TTI) based uplink scheduling request format; or whether the UE supports use of a specific-length TTI based uplink scheduling request format.

By way of example, among multiple UEs, user capability information of the UEs includes: for example, UE 1 merely supports use of a 1 ms TTI based uplink scheduling request format, but does not support use of a short TTI (e.g., shorter than 1 ms) based uplink scheduling request format; UE 2 supports use of a 1 ms TTI based uplink scheduling request format and use of a 0.5 ms TTI based uplink scheduling request format; UE 3 supports use of a 0.25 ms TTI based uplink scheduling request format, and use of a 1 ms TTI based uplink scheduling request format.

The network device may configure the mapping relationship based on the user capability information of the UE.

For example, according to the user capability information of the UE, if the UE supports a short TTI (e.g., 0.25 ms), the uplink scheduling request formats in the mapping relationship correspond to the short TTI. If the UE does not support short TTI, the uplink scheduling request formats in the mapping relationship correspond to a long TTI (e.g., 1 ms).

Further, in action 401, the different sidelink data may include various types of sidelink data, which include but are not limited to the following.

Alternatively, the different sidelink data include sidelink data with different ProSePer-Packet Priority (PPPP) values.

Alternatively, the different sidelink data include sidelink data with different ProSePer-Packet Reliablity (PPPR) values.

Alternatively, the different sidelink data include sidelink data with different quality of service (QoS) attribute values.

Alternatively, the different sidelink data include sidelink data in different sidelink logical channels or different sidelink logical channel groups.

Alternatively, the different sidelink data include sidelink data with different service identifiers.

Alternatively, the different sidelink data include sidelink data with different destination addresses.

Similarly, the different uplink scheduling request formats may include various types of uplink scheduling request formats, which include but are not limited to the following.

Alternatively, the different uplink scheduling request formats include uplink scheduling request formats based on different lengths of TTIs.

Alternatively, the different uplink scheduling request formats include uplink scheduling request formats based on different physical uplink control channel (PUCCH) formats.

Furthermore, in the mapping relationship, each type of sidelink data may be mapped to a respective uplink scheduling request format, or may be mapped to a plurality of uplink scheduling request formats. When a type of sidelink data is mapped to a plurality of uplink scheduling request formats, any of the plurality of uplink scheduling request formats may be selected for use.

Alternatively, different data in a same logical channel group may be mapped to an uplink scheduling request format that can be used by all data in the logical channel group. For example, data 1 and data 2 are in a same logical channel group. The data 1 is mapped to a first uplink scheduling request format, and the data 2 is mapped to the first uplink scheduling request format and a second uplink scheduling request format. In this case, the first uplink scheduling request format is used for both the data 1 and the data 2 in the logical channel group.

Alternatively, in the embodiment, the uplink scheduling request includes an uplink scheduling request (SR).

A second embodiment of the disclosure relates to a method for wireless communication.

Figure 5:
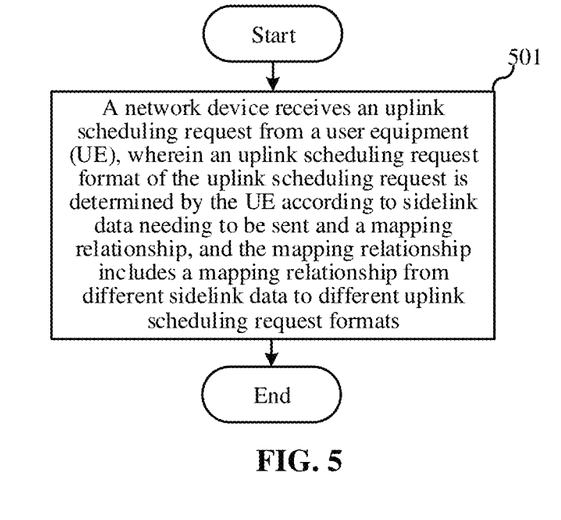
FIG. 5 illustrates a schematic flowchart of a method for wireless communication according to a second embodiment of the disclosure.

It is to be noted that, the method for wireless communication in the first embodiment is described from the view of a UE end, and the method for wireless communication in the second embodiment is described from a network device end. They both correspond to an interaction process between the UE and the network device, and are based on a consistent technical idea. Reference can be made to each other for related details. FIG. 5 illustrates a schematic flowchart of the method for wireless communication. In particular, as illustrated in FIG. 5, the method for wireless communication includes action 501.

In action 501, a network device receives an uplink scheduling request from a user equipment (UE). An uplink scheduling request format of the uplink scheduling request is determined by the UE according to sidelink data needing to be sent and a mapping relationship, and the mapping relationship includes a mapping relationship from different sidelink data to different uplink scheduling request formats. After that, the procedure ends.

Alternatively, before action 501, the method for wireless communication may further include that: the network device configures the mapping relationship, and the network device sends the mapping relationship to the UE.

Further, alternatively, before the network device configures the mapping relationship, the method for wireless communication may further include that: the network device receives, from the UE, user capability information of the UE.

Alternatively, the user capability information includes at least one of: whether the UE supports use of a short transmission time interval (TTI) based uplink scheduling request format; or whether the UE supports use of a specific-length TTI based uplink scheduling request format.

By way of example, among multiple UEs, user capability information of the UEs includes: for example, UE 1 merely supports use of a 1 ms TTI based uplink scheduling request format, but does not support use of a short TTI (e.g., shorter than 1 ms) based uplink scheduling request format; UE 2 supports use of a 1 ms TTI based uplink scheduling request format and use of a 0.5 ms TTI based uplink scheduling request format; UE 3 supports use of a 0.25 ms TTI based uplink scheduling request format, and use of a 1 ms TTI based uplink scheduling request format.

Alternatively, the above action that the network device configures the mapping relationship includes that: the network device configures the mapping relationship based on the user capability information of the UE.

For example, according to the user capability information of the UE, if the UE supports a short TTI (e.g., 0.25 ms), the uplink scheduling request formats in the mapping relationship correspond to the short TTI. If the UE does not support the short TTI, the uplink scheduling request formats in the mapping relationship correspond to a long TTI (e.g., 1 ms).

Further, in action 501, the different sidelink data may include various types of sidelink data, which include but are not limited to the following.

Alternatively, the different sidelink data include sidelink data with different ProSePer-Packet Priority (PPPP) values.

Alternatively, the different sidelink data include sidelink data with different ProSePer-Packet Reliablity (PPPR) values.

Alternatively, the different sidelink data includes sidelink data with different quality of service (QoS) attribute values.

Alternatively, the different sidelink data includes sidelink data in different sidelink logical channels or different sidelink logical channel groups.

Alternatively, the different sidelink data includes sidelink data with different service identifiers.

Alternatively, the different sidelink data includes sidelink data with different destination addresses.

Similarly, the different uplink scheduling request formats may include various types of uplink scheduling request formats, which include but are not limited to the following.

Alternatively, the different uplink scheduling request formats include uplink scheduling request formats based on different lengths of TTIs.

Alternatively, the different uplink scheduling request formats include uplink scheduling request formats based on different physical uplink control channel (PUCCH) formats.

Furthermore, in the mapping relationship, each type of sidelink data may be mapped to a respective uplink scheduling request format, or may be mapped to a plurality of uplink scheduling request formats. When a type of sidelink data is mapped to a plurality of uplink scheduling request formats, any of the plurality of uplink scheduling request formats may be selected for use.

Alternatively, different data in a same logical channel group may be mapped to an uplink scheduling request format that can be used by all data in the logical channel group. For example, data 1 and data 2 are in a same logical channel group. The data 1 is mapped to a first uplink scheduling request format, and the data 2 is mapped to the first uplink scheduling request format and a second uplink scheduling request format. In this case, the first uplink scheduling request format is used for the data 1 and the data 2 uniformly in the logical channel group.

Alternatively, in the embodiment, the uplink scheduling request includes an uplink scheduling request (SR).

Figure 6:
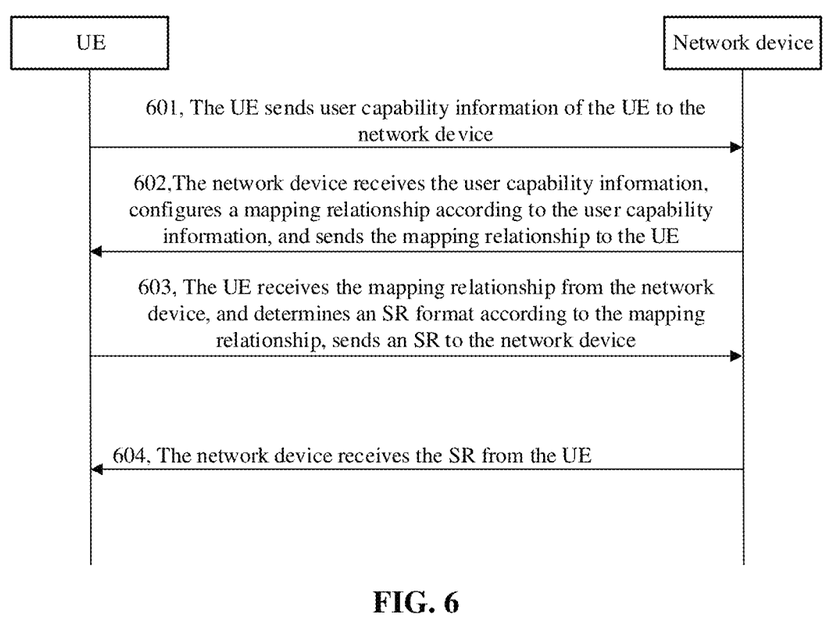
FIG. 6 illustrates a schematic flowchart of a method of wireless communication for implementing interaction between a user equipment (UE) and a network device according to embodiments of the disclosure.

A particular embodiment of the disclosure is described below. FIG. 6 illustrates a schematic flowchart of a method of wireless communication for implementing interaction between a user equipment (UE) and a network device according to the embodiment. In particular, as illustrated in FIG. 6, the method of wireless communication for implementing interaction between the UE and the network device includes actions 601 to 604.

In action 601, the UE sends user capability information of the UE to the network device.

Alternatively, the user capability information includes at least one of: whether the UE supports use of a short transmission time interval (TTI) based uplink scheduling request (SR) format; or whether the UE supports use of a specific-length TTI based uplink SR format.

By way of example, among multiple UEs, user capability information of the UEs includes: for example, UE 1 merely supports use of a 1 ms TTI based uplink scheduling request format, but does not support use of a short TTI (e.g., shorter than 1 ms) based uplink scheduling request format; UE 2 supports use of a 1 ms TTI based uplink scheduling request format and use of a 0.5 ms TTI based uplink scheduling request format; UE 3 supports use of a 0.25 ms TTI based uplink scheduling request format, and use of a 1 ms TTI based uplink scheduling request format.

After that, action 602 is performed. The network device receives the user capability information from the UE, configures a mapping relationship between sidelink (SL) data and SR formats according to the user capability information, and sends the mapping relationship to the UE. For example, according to the user capability information of the UE, if the UE supports a short TTI (e.g., 0.25 ms), the uplink scheduling request (SR) formats in the mapping relationship correspond to the short TTI. If the UE does not support the short TTI, the uplink scheduling request (SR) format in the mapping relationship corresponds to a long TTI (e.g., 1 ms).

Alternatively, the network device allocates different SR resources to the UE, including at least two SR resources for different TTI lengths. At the same time, the network device configures a mapping relationship for different SL data and different SR formats. The different SR formats in the mapping relationship correspond to the different SR resources above.

Alternatively, in the mapping relationship, i. each type of SL data may be mapped to a respective SR format; and ii, each type of SL data may also be mapped to a plurality of SR formats.

The different types of SL data above may be: i. SL data with different PPPP values; ii. SL data with different PPPR values; iii. SL data with different QoS attribute values; iv. SL data in different SL logical channels or different SL logical channel groups; v. SL data with different service identifiers (ID); or vi. SL data with different destination addresses.

The different SR formats may be: i. SR formats based on different TTI lengths; and ii. SR formats based on different PUCCH formats.

After that, action 603 is performed. The UE receives the mapping relationship from the network device, determines an SR format according to the mapping relationship, and sends an SR to the network device.

Transmission of the SR is triggered by target SL data.

Alternatively, a. according to the above mapping relationship, if the target SL data is mapped to a specific SR format, the SR format is used to request for a resource; and b. according to the above mapping relationship, if the target SL data is not mapped to the specific SR format, and there is also no other SL data, for triggering SR transmission, mapped to the specific SR format, the SR format is will not be used for resource requesting.

After that, action 604 is performed, in which the network device receives the SR from the UE.

Alternatively, the network device may determine, according to the SR format, whether the SL data for triggering SR transmission requires a low delay, so as to grant a matched resource.

In particular, after receiving the SR from the UE, the network device determines the UE applying for an uplink resource, and determines, according to the SR format of the received SR, a type of the SL data which has triggered the uplink resource applying, so as to allocate a corresponding uplink resource. The network device notifies the UE of the uplink resource by issuing downlink control information (DCI).

A third embodiment of the disclosure relates to a user equipment (UE).

Figure 7:
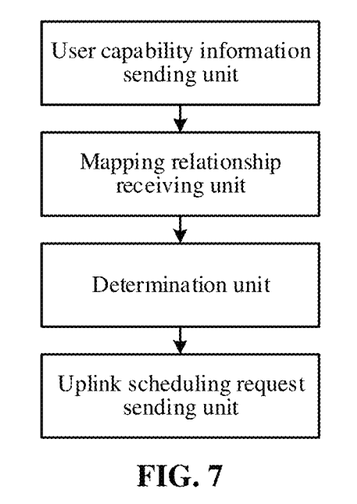
FIG. 7 illustrates a block diagram of a user equipment (UE) according to a third embodiment of the disclosure.

FIG. 7 illustrates a block diagram of the UE. In particular, as illustrated in FIG. 7, the UE includes a determination unit and an uplink scheduling request sending unit.

The determination unit is configured to determine, according to a mapping relationship, an uplink scheduling request format corresponding to sidelink data needing to be sent. The mapping relationship includes a mapping relationship from different sidelink data to different uplink scheduling request formats.

The uplink scheduling request sending unit is configured to send, according to the uplink scheduling request format determined by the determination unit, an uplink scheduling request to a network device.

Alternatively, the UE may further include a mapping relationship receiving unit configured to receive the mapping relationship from the network device.

Alternatively, the UE may further include a user capability information sending unit, configured to send user capability information of the UE to the network device.

Alternatively, the user capability information includes at least one of: whether the UE supports use of a short transmission time interval (TTI) based uplink scheduling request format; or whether the UE supports use of a specific-length TTI based uplink scheduling request format.

By way of example, among multiple UEs, user capability information of the UEs includes: for example, UE 1 merely supports use of a 1 ms TTI based uplink scheduling request format, but does not support use of a short TTI (e.g., shorter than 1 ms) based uplink scheduling request format; UE 2 supports use of a 1 ms TTI based uplink scheduling request format and use of a 0.5 ms TTI based uplink scheduling request format; UE 3 supports use of a 0.25 ms TTI based uplink scheduling request format, and use of a 1 ms TTI based uplink scheduling request format.

The network device may configure the mapping relationship based on the user capability information of the UE.

For example, according to the user capability information of the UE, if the UE supports a short TTI (e.g., 0.25 ms), the uplink scheduling request formats in the mapping relationship correspond to the short TTI. If the UE does not support short TTI, the uplink scheduling request formats in the mapping relationship correspond to a long TTI (e.g., 1 ms).

Further, the different sidelink data may include various types of sidelink data, which include but are not limited to the following.

Alternatively, the different sidelink data include sidelink data with different ProSePer-Packet Priority (PPPP) values.

Alternatively, the different sidelink data include sidelink data with different ProSePer-Packet Reliablity (PPPR) values.

Alternatively, the different sidelink data includes sidelink data with different quality of service (QoS) attribute values.

Alternatively, the different sidelink data includes sidelink data in different sidelink logical channels or different sidelink logical channel groups.

Alternatively, the different sidelink data includes sidelink data with different service identifiers.

Alternatively, the different sidelink data includes sidelink data with different destination addresses.

Similarly, the different uplink scheduling request formats may include various types of uplink scheduling request formats, which include but are not limited to the following.

Alternatively, the different uplink scheduling request formats include uplink scheduling request formats based on different lengths of TTIs.

Alternatively, the different uplink scheduling request formats include uplink scheduling request formats based on different physical uplink control channel (PUCCH) formats.

Furthermore, in the mapping relationship, each type of sidelink data may be mapped to a respective uplink scheduling request format, or may be mapped to a plurality of uplink scheduling request formats. When a type of sidelink data is mapped to a plurality of uplink scheduling request formats, any of the plurality of uplink scheduling request formats may be selected for use.

Alternatively, different data in a same logical channel group may be mapped to an uplink scheduling request format that can be used by all data in the logical channel group. For example, data 1 and data 2 are in a same logical channel group. The data 1 is mapped to a first uplink scheduling request format, and the data 2 is mapped to the first uplink scheduling request format and a second uplink scheduling request format. In this case, the first uplink scheduling request format is used for both the data 1 and the data 2 in the logical channel group.

Alternatively, in the embodiment, the uplink scheduling request includes an uplink scheduling request (SR).

The first embodiment is a method embodiment corresponding to this embodiment, and this embodiment may be implemented in cooperation with the first embodiment. Related technical details involved in the first embodiment also work for this embodiment, which will not be described here, to reduce repetition. Correspondingly, the related technical details involved in this embodiment may also be applied to the first embodiment.

A fourth embodiment of the disclosure relates to a network device.

Figure 8:
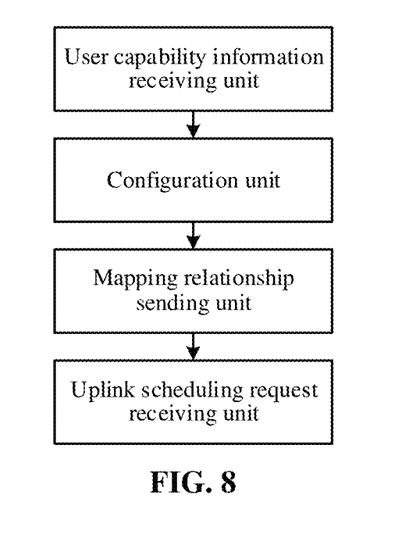
FIG. 8 illustrates a block diagram of a network device according to a fourth embodiment of the disclosure.

FIG. 8 illustrates a block diagram of the network device. In particular, as illustrated in FIG. 8, the network device includes an uplink scheduling request receiving unit.

The uplink scheduling request receiving unit is configured to receive an uplink scheduling request from a user equipment (UE). An uplink scheduling request format of the uplink scheduling request is determined by the UE according to sidelink data needing to be sent and a mapping relationship, and the mapping relationship includes a mapping relationship from different sidelink data to different uplink scheduling request formats.

Alternatively, the network device may further include a configuration unit and a mapping relationship sending unit.

The configuration unit is configured to configure the mapping relationship.

The mapping relationship sending unit is configured to send the mapping relationship to the UE, so that the UE determines the uplink scheduling request format of the uplink scheduling request according to sidelink data needing to be sent.

Alternatively, the network device may further include a user capability information receiving unit.

The user capability information receiving unit is configured to receive user capability information of the UE from the UE.

Alternatively, the user capability information includes at least one of: whether the UE supports use of a short transmission time interval (TTI) based uplink scheduling request format; or whether the UE supports use of a specific-length TTI based uplink scheduling request format.

By way of example, among multiple UEs, user capability information of the UEs includes: for example, UE 1 merely supports use of a 1 ms TTI based uplink scheduling request format, but does not support use of a short TTI (e.g., shorter than 1 ms) based uplink scheduling request format; UE 2 supports use of a 1 ms TTI based uplink scheduling request format and use of a 0.5 ms TTI based uplink scheduling request format; UE 3 supports use of a 0.25 ms TTI based uplink scheduling request format, and use of a 1 ms TTI based uplink scheduling request format.

Further, alternatively, the configuration unit is further configured to configure the mapping relationship according to the user capability information received by the user capability information receiving unit.

For example, according to the user capability information of the UE, if the UE supports a short TTI (e.g., 0.25 ms), the uplink scheduling request formats in the mapping relationship correspond to the short TTI. If the UE does not support the short TTI, the uplink scheduling request formats in the mapping relationship correspond to a long TTI (e.g., 1 ms).

Further, the different sidelink data may include various types of sidelink data, which include but are not limited to the following.

Alternatively, the different sidelink data include sidelink data with different ProSePer-Packet Priority (PPPP) values.

Alternatively, the different sidelink data include sidelink data with different ProSePer-Packet Reliablity (PPPR) values.

Alternatively, the different sidelink data include sidelink data with different quality of service (QoS) attribute values.

Alternatively, the different sidelink data include sidelink data in different sidelink logical channels or different sidelink logical channel groups.

Alternatively, the different sidelink data include sidelink data with different service identifiers.

Alternatively, the different sidelink data include sidelink data with different destination addresses.

Similarly, the different uplink scheduling request formats may include various types, which include but are not limited to the following.

Alternatively, the different uplink scheduling request formats include uplink scheduling request formats based on different lengths of TTIs.

Alternatively, the different uplink scheduling request formats include uplink scheduling request formats based on different physical uplink control channel (PUCCH) formats.

Furthermore, in the mapping relationship, each type of sidelink data may be mapped to a respective uplink scheduling request format, or may be mapped to a plurality of uplink scheduling request formats. When a type of sidelink data is mapped to a plurality of uplink scheduling request formats, any of the plurality of uplink scheduling request formats may be selected for use.

Alternatively, different data in a same logical channel group may be mapped to an uplink scheduling request format that can be used by all data in the logical channel group. For example, data 1 and data 2 are in a same logical channel group. The data 1 is mapped to a first uplink scheduling request format, and the data 2 is mapped to the first uplink scheduling request format and a second uplink scheduling request format. In this case, the first uplink scheduling request format is used for both the data 1 and the data 2 in the logical channel group.

Alternatively, in the embodiment, the uplink scheduling request includes an uplink scheduling request (SR).

The second embodiment is a method embodiment corresponding to this embodiment, and this embodiment may be implemented in cooperation with the second embodiment. Related technical details involved in the second embodiment also work for this embodiment, which will not be described here, to reduce repetition. Correspondingly, the related technical details involved in this embodiment may also be applied to the second embodiment.

A fifth embodiment of the disclosure relates to a communication device.

Figure 9:
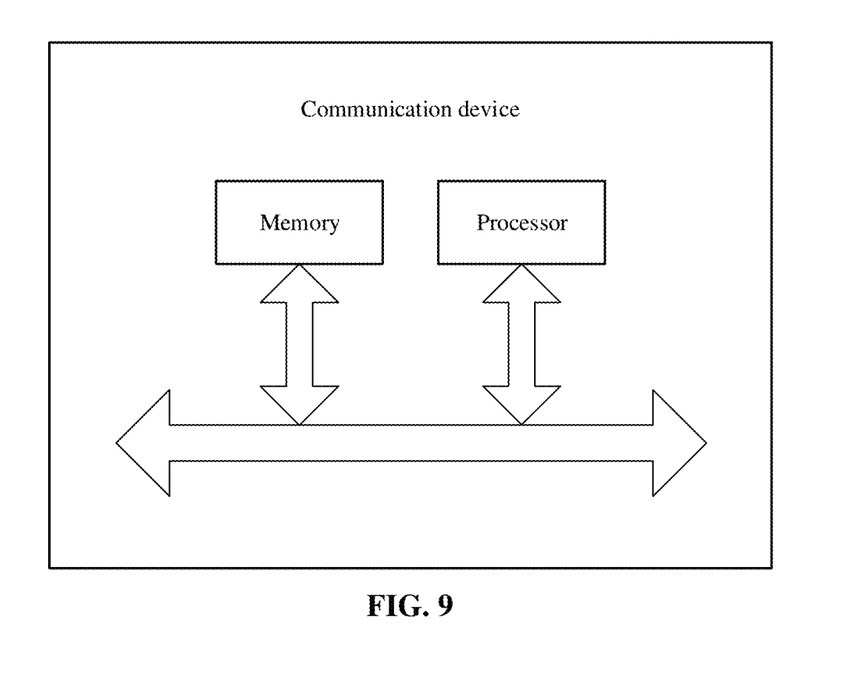
FIG. 9 illustrates a block diagram of a communication device according to a fifth embodiment of the disclosure.

FIG. 9 illustrates a block diagram of the communication device. In particular, as illustrated in FIG. 9, the communication device includes a processor and a memory. The memory may store computer-executable instructions, and the processor may execute the computer-executable instructions stored in the memory.

Alternatively, the processor may call the computer-executable instructions stored in the memory, to perform corresponding actions of the UE in the embodiment of the method for wireless communication, which will not be described here for simplicity.

Alternatively, the processor may call the computer-executable instructions stored in the memory, to perform corresponding actions of the network device in the embodiment of the method for wireless communication, which will not be described here for simplicity.

It is to be noted that, those of ordinary skill in the art should understand that functions realized by units in the embodiments of the UE and the network device may be understood with reference to relevant description of the above methods for wireless communication. The functions of the units in the embodiments of the UE and the network device may be realized by a program (executable instructions) running on a processor, and may also be realized by a particular logic circuit. The UE in the embodiments of the disclosure, when embodied in a form of software functional modules and sold or used as an independent product, may also be stored in a computer-readable storage medium. Based on such an understanding, the technical solution according to the embodiments of the embodiments, in essence or in part contributing to the related art, may be embodied in the form of a software product. The computer software product is stored in a storage medium and includes several instruction to enable a computer device (which may be a personal computer, a server, a network device or the like) to execute all or part of the method according to various embodiments of the disclosure. The above storage medium includes various mediums that can storage program codes, such as a USB flash disk, a read-only memory (ROM), a magnetic disc or an optical disk. As such, the embodiments of the disclosure are not limited to any specific combination of hardware and software.

Correspondingly, also provided in embodiments of the disclosure is a computer storage medium with computer-executable instructions stored therein. The computer-executable instructions, when executed by a processor, causes the processor to implement the method embodiments of the disclosure.

It is to be noted that, in the specification, relational terms such as "first" and "second" are merely used to distinguish one entity or operation from another entity or operation, and does not necessarily require or imply any such actual relation or sequence between the entities or operations. Moreover, terms "comprise", "include" or any other variants thereof are intended to be non-exclusive, so that a process, method, article or device including a series of elements may not only include the element, but may also include other elements not clearly listed, or elements inherent to the process, method, article or device. Without more limitations, a process, method, article or device limited as "comprising an element" does not exclude other same elements from the process, method, article or device comprising the element. In the disclosure, if it is referred that a behavior is executed according to an element, it means that the behavior is executed at least based on the element. Two situations are included: the behavior is executed only based on the element, and the behavior is executed based on the element and another element. The expressions such as "a plurality of", "multiple" and "several" include the case of two and the case of more than two.

All documents referred in the description are incorporated here by reference, as each of the documents is referred to by reference alone. In addition, it is to be understood that, upon reading the content of the disclosure, those of ordinary skill in the art may make various changes or modifications to the disclosure. These equivalents also fall within the scope of protection of the disclosure.

The invention claimed is:

1. A method for wireless communication, comprising:
sending, by a user equipment (UE), user capability information of the UE to a network device; wherein the user capability information is used for the network device to configure a mapping relationship from different sidelink data with different quality of service (QoS) attribute values to different uplink scheduling request formats based on different physical uplink control channel (PUCCH) formats;

receiving, by the UE, the mapping relationship from the network device;

determining, by the UE, according to the mapping relationship, an uplink scheduling request format corresponding to sidelink data needing to be sent; and sending, by the UE, according to the uplink scheduling request format, an uplink scheduling request to the network device.

2. The method according to claim 1, wherein the user capability information comprises at least one of:

whether the UE supports use of a short transmission time interval (TTI) based uplink scheduling request format; or whether the UE supports use of a specific-length TTI based uplink scheduling request format.

3. The method according to claim 2, wherein the uplink scheduling request formats in the mapping relationship are correspond to a TTI format supported by the UE.

4. The method according to claim 1, wherein the sidelink data with different QoS attribute values have different ProSePer-Packet Priority (PPPP) values.

5. The method according to claim 1, wherein the sidelink data with different QoS attribute values have different ProSePer-Packet Reliability (PPPR) values.

6. The method according to claim 1, wherein the sidelink data with different QoS attribute values have different destination addresses.

7. The method according to claim 1, wherein the different uplink scheduling request formats comprise uplink scheduling request formats based on different lengths of TTIs.

8. The method according to claim 1, wherein in the mapping relationship, each type of sidelink data is mapped to a respective uplink scheduling request format.

9. User equipment (UE), comprising:

a memory with computer-executable instructions stored therein; and a processor, configured to execute the computer-executable instructions so as to perform actions of a method for wireless communication, the actions comprise:

sending user capability information of the UE to a network device; wherein the user capability information is used for the network device to configure a mapping relationship from different sidelink data with different quality of service (QoS) attribute values to different uplink scheduling request formats based on different physical uplink control channel (PUCCH) formats;

receiving the mapping relationship from the network device;

determining, according to the mapping relationship, an uplink scheduling request format corresponding to sidelink data needing to be sent; and sending, according to the uplink scheduling request format, an uplink scheduling request to the network device.

10. The UE according to claim 9, wherein the user capability information comprises at least one of:

whether the UE supports use of a short transmission time interval (TTI) based uplink scheduling request format; or whether the UE supports use of a specific-length TTI based uplink scheduling request format.

11. The UE according to claim 10, wherein the uplink scheduling request formats in the mapping relationship correspond to a TTI format supported by the UE.

12. The UE according to claim 9, wherein the sidelink data with different QoS attribute values have different ProSePer-Packet Priority (PPPP) values.

13. The UE according to claim 9, wherein the sidelink data with different QoS attribute values have different ProSePer-Packet Reliablity (PPPR) values.

14. The UE according to claim 9, wherein the sidelink data with different QoS attribute values have different destination addresses.

15. The UE according to claim 9, wherein the different uplink scheduling request formats comprise uplink scheduling request formats based on different lengths of TTIs.

16. The UE according to claim 9, wherein in the mapping relationship, each type of sidelink data is mapped to a respective uplink scheduling request format.

17. A non-transitory computer-readable storage medium with computer-executable instructions stored therein, wherein the computer-executable instructions, when executed by a processor, cause the processor to perform actions of sending user capability information of a user equipment (UE) to a network device; wherein the user capability information is used for the network device to configure a mapping relationship from different sidelink data with different quality of service (QoS) attribute values to different uplink scheduling request formats based on different physical uplink control channel (PUCCH) formats;

receiving the mapping relationship from the network device;

determining an uplink scheduling request format corresponding to sidelink data needing to be sent according to the mapping relationship; and sending an uplink scheduling request to the network device according to the uplink scheduling request format.

18. The non-transitory computer-readable storage medium according to claim 17, wherein the user capability information comprises at least one of:

whether the UE supports use of a short transmission time interval (TTI) based uplink scheduling request format; or whether the UE supports use of a specific-length TTI based uplink scheduling request format.

19. The non-transitory computer-readable storage medium according to claim 17, wherein the sidelink data with different QoS attribute values have different ProSePer-Packet Priority (PPPP) values.

20. The non-transitory computer-readable storage medium according to claim 17, wherein the sidelink data with different QoS attribute values have different ProSePer-Packet Reliability (PPPR) values.

* * * * *